Jan. 21, 1969     P. J. WIETRZYKOWSKI     3,423,142

PLANETARY BEARING

Filed Dec. 5, 1966

INVENTOR.

Paul J. Wietrzykowski

United States Patent Office 3,423,142
Patented Jan. 21, 1969

3,423,142
PLANETARY BEARING
Paul J. Wietrzykowski, 1617 N. Wood St.,
Chicago, Ill. 60622
Filed Dec. 5, 1966, Ser. No. 598,982
U.S. Cl. 308—206　　1 Claim
Int. Cl. F16c 19/56

ABSTRACT OF THE DISCLOSURE

A bearing comprised of a series of rollers in planetary arrangement between an inner race and an outer race, a first group of the rollers engaging the inner race and another group of rollers engaging the outer race, the two groups of rollers engaging each other and having a keeper ring therebetween.

---

This invention relates to bearings, and more particularly to an improved roller bearing.

It is therefore the main purpose of this invention to provide a planetary bearing which will initially reduce friction as compared with those of the prior art.

Another object of this invention is to provide a planetary bearing which will have a plurality of radially spaced apart rollers of large diameter which will be in rolling engagement with a quantity of regularly spaced apart small diameter rollers, all contained within a large outer race and a small inner race, thus effect a tight and practical assembly.

Another object of this invention is to provide a bearing in which the rollers of large diameter and small diameter will be held in proper operating position by means of a pair of spaced apart circular rings which will ride within annular grooves of the rollers.

Still another object of this invention is to provide a bearing which in operation will have only rolling friction, and the structure will be of such design so as to prevent sliding friction, thus making the use of lubricating oils unnecessary for smooth operation and long wear thereof.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figure 1:
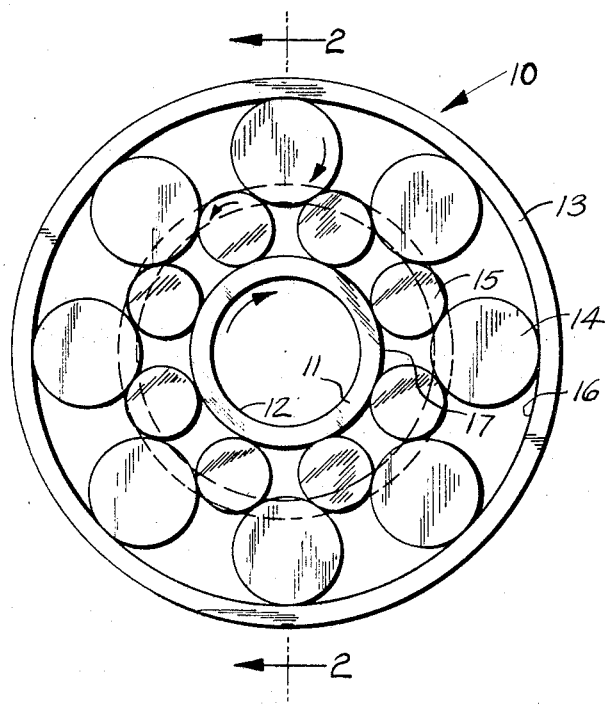
FIGURE 1 is a plan view of this invention.

According to this invention, a planetary bearing 10 is provided with an inner race 11, the inner periphery 12 by which engages the outer periphery of the rotatable shaft (not shown). Inner race 11 provide support means for bearing 10 in a well known manner.

An outer race 13 of bearing 10 encloses a plurality of radially spaced apart large diameter rollers 14 which are in rolling engagement with a plurality of spaced apart small diameter rollers 15 which provide a means for supporting a load upon the shaft received within race 11. The large diameter rollers 14 are also in rolling engagement with the inner periphery 16 of outer race 13 and the small diameter rollers 15 are also in rolling engagement with the outer periphery 17 of race 11.

Figure 2:
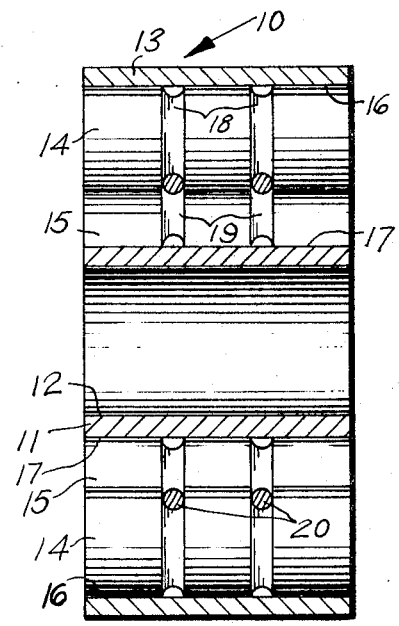
FIGURE 2 is a cross-sectional view taken on the lines 2—2 of FIGURE 1.
Figure 3:
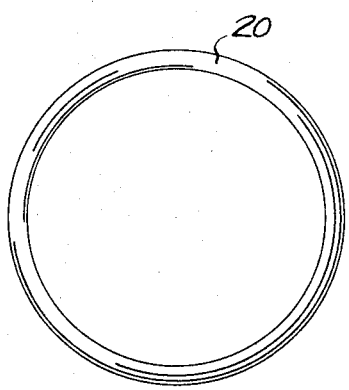
FIGURE 3 is a plan view of the keeper ring shown removed from the invention.

Looking now at FIGURE 2 of the drawing, one will see that large diameter rollers 14 are provided with a pair of spaced apart annular grooves 18 and a small diameter roller 15 is provided with similar grooves 19. The grooves 18 and 19 respectively receive the circular keeper ring 20 which thus keeps the rollers 14 and 15 in proper alignment and effectively preventing inlay forward or rearwardly.

It will be noted that the principle of operation of bearing 10 is that when the shaft (not shown) received within race 11 turns clock-wise, the small diameter rollers 15 rotate counter-clock-wise which will in turn rotate the large diameter rollers 14 clock-wise as the keeper ring 20 prevents the two layers of rollers from wedging or enroaching upon each other and the keeper will also rotate counter-clock-wise.

It is to be further noted that the inner periphery 16 of the outer race and the outer periphery 17 of the inner race do not have any engaging means with the annular grooves 18 and 19 respectively of the rollers, whereby the rollers may move laterally as a unit between the races.

It shall further be noted that various types of face keepers may be incorporated in the over-all design if desired.

What I now claim is:

1. A planetary bearing, comprising in combination a plurality of counter rotating roller members, race means for enclosing said roller members, and means for maintaining the alignment of said roller members relative to each other while being carried freely within said race means, said race means comprising an inner race and an outer race, said roller members comprising a first group of rollers in engagement with an outer periphery of said inner race, a second group of rollers in engagement with an inner periphery of said outer race, said first and said second group of rollers being in engagement with each other, each of said rollers in each of said groups having an annular groove, a circular keeper ring positioned between said groups of rollers, said circular keeper ring being in engagement with said annular grooves of both said groups of rollers, said first and second group of rollers with said keeper ring comprising a roller assembly which is carried free of lateral restriction movement between said races.

References Cited

UNITED STATES PATENTS

| | | | |
|---|---|---|---|
| 258,413 | 5/1882 | Griffith | 308—206 |
| 1,505,311 | 8/1924 | Callaghan | 308—206 |

FOREIGN PATENTS 90,484　　5/1895　　Germany.

MARTIN P. SCHWADRON, Primary Examiner.

FRANK SUSKO, Assistant Examiner.